(No Model.)

B. SWIFT.
POLISHING IRON.

No. 390,817.        Patented Oct. 9, 1888.

WITNESSES:
Gustave Dieterich
T. F. Bourne

INVENTOR.
Benjamin Swift
BY Briesen & Steele
ATTORNEYS.

UNITED STATES PATENT OFFICE.

BENJAMIN SWIFT, OF BROOKLYN, NEW YORK, ASSIGNOR OF ONE-HALF TO BENJAMIN C. SMITH, OF SAME PLACE.

POLISHING-IRON.

SPECIFICATION forming part of Letters Patent No. 390,817, dated October 9, 1888.

Application filed June 17, 1887. Serial No. 241,596. (No model.)

*To all whom it may concern:*

Be it known that I, BENJAMIN SWIFT, of Brooklyn, Kings county, New York, have invented a new and Improved Polishing-Iron, of which the following is a full, clear, and exact description.

The object of my invention is to provide an improved iron for polishing linen and similar articles.

The invention consists in a rectangular plate of metal having rounding polishing-edges at the ends and sides, combined with a handle detachably secured thereto. When in position, said handle is rigidly connected to the head, and serves to give increased leverage to and a firm command over the polisher.

Reference is to be had to the accompanying drawings, forming part of this specification, in which—

Figure 1:
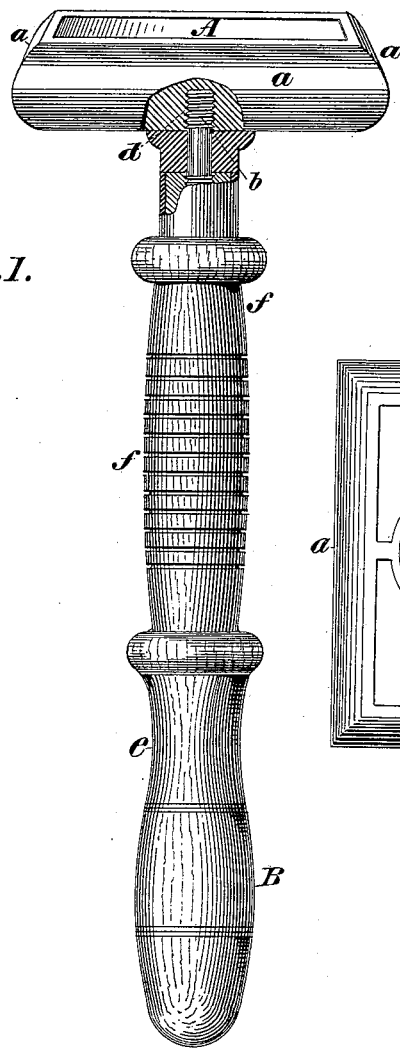
Figure 2:
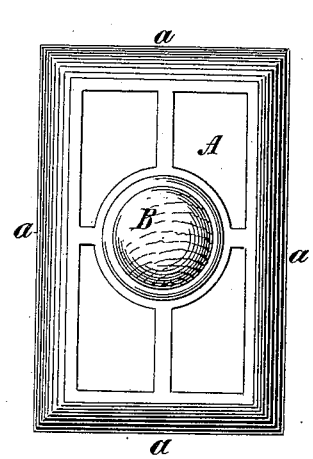

Figure 1 is a perspective view, part being broken away, of my improved polishing-iron; and Fig. 2 is a face view of same.

A in the drawings represents the head proper of my improved polisher. This is shown in Fig. 2 as of rectangular outline, with rounded but straight ends and sides $a$, which constitute smooth rounded polishing-surfaces.

The head A carries a handle, B, which is removably secured thereto by means of a screw, $b$, carried by the handle entering a threaded aperture, $d$, in the back of the head A, preferably near its center. The handle B is long enough to receive both hands of the operator, and preferably has depressions $e$ and $f$ for convenience of gripping. I prefer to make the handle B of some non-conductor of heat.

To use this polishing-iron, the handle B should first be removed from the head A. The head A is then heated to a sufficient degree, and the handle B then placed in position on it by inserting the screw $b$ into the hole $d$, which can be done without touching the heated head with the hands. The operator then grasps the handle B and rubs one of the rounded surfaces $a$ over the article to be polished. By the use of this handle I am enabled to get a good leverage and a firm command of the iron. By making my handle removable it is at all times cool and ready to be grasped by the bare hands.

Having now described my invention, what I claim is—

In a polishing-iron, the rectangular head A, having rounded but straight polishing-edges $a$ at the ends and sides, combined with the handle B, detachably secured to the iron head A, substantially as described.

BENJAMIN SWIFT.

Witnesses:
HARRY M. TURK,
CHARLES M. THOMAS.